(12) United States Patent
Martin et al.

(10) Patent No.: US 8,136,391 B2
(45) Date of Patent: Mar. 20, 2012

(54) NON-INTRUSIVE EGR MONITOR FOR A HYBRID ELECTRIC VEHICLE

(75) Inventors: Douglas Raymond Martin, Canton, MI (US); Richard Paul Taylor, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 12/793,310

(22) Filed: Jun. 3, 2010

(65) Prior Publication Data

US 2011/0174066 A1 Jul. 21, 2011

(51) Int. Cl.
*G01M 15/05* (2006.01)
(52) U.S. Cl. .................................................. 73/114.74
(58) Field of Classification Search ............... 73/114.31, 73/114.37, 114.69, 114.74, 114.77
See application file for complete search history.

(56) References Cited

U.S. PATENT DOCUMENTS

| 5,671,141 | A | 9/1997 | Smith et al. |
| 6,078,861 | A | 6/2000 | Zimmerman et al. |
| 6,098,602 | A | 8/2000 | Martin et al. |
| 6,119,662 | A | 9/2000 | Duty et al. |
| 6,257,214 | B1 | 7/2001 | Bidner et al. |
| 6,850,833 | B1 * | 2/2005 | Wang et al. ................... 701/108 |
| 7,406,947 | B2 | 8/2008 | Lewis et al. |
| 7,739,027 | B2 * | 6/2010 | Kang et al. ................... 701/108 |
| 2001/0035172 | A1 * | 11/2001 | Osaki et al. ............. 123/568.16 |
| 2003/0029233 | A1 * | 2/2003 | Ting et al. ..................... 73/118.1 |
| 2005/0199050 | A1 * | 9/2005 | Matsumoto ................... 73/117.3 |
| 2009/0048765 | A1 * | 2/2009 | Kang et al. ................... 701/108 |
| 2010/0179769 | A1 * | 7/2010 | Zrilli .............................. 702/24 |
| 2011/0023845 | A1 * | 2/2011 | Allain et al. ............. 123/568.16 |

* cited by examiner

*Primary Examiner* — Eric S McCall
(74) *Attorney, Agent, or Firm* — David Kelley; Brooks Kushman P.C.

(57) ABSTRACT

An EGR fault in an engine is detected by comparing actual MAP values with inferred MAP values, the latter being based on MAF and engine speed. Multiple pairs of inferred and actual MAP, some having low EGR and other having high EGR rate. The two values are expected to deviate at high EGR rate and to be nearly equal at low EGR rate. If no such deviation at high EGR, then a fault is determined. According to the present disclosure, the computation of inferred MAP includes a compensation for flow into the intake through a carbon canister system. Without such compensation, the EGR routine is applied to situations without flow from the canister. Such a limitation caused a problem in HEV vehicles, in which engine operating time is less than typical engine installations. Additionally, the confounding effects of rapid VVT movement are excluded from the computations.

20 Claims, 4 Drawing Sheets

NON-INTRUSIVE EGR MONITOR FOR A HYBRID ELECTRIC VEHICLE

BACKGROUND

1. Technical Field

The present disclosure relates to onboard diagnostics methods and systems for automotive vehicles, in particular related to diagnosing exhaust gas recirculation (EGR) systems.

2. Background Art

Vehicular systems that affect automotive emissions are provided with onboard diagnostics (OBD) to determine whether a fault in the system has occurred and to alert the vehicle operator to procure maintenance when such a fault has occurred. Proper operation of the EGR system impacts emission levels and so proper operation is determined via an OBD routine.

One OBD routine, called an intrusive monitor, is described in U.S. Pat. No. 6,257,214, commonly assigned and incorporated herein in its entirety. It is known that at a given speed-torque operating condition that manifold absolute pressure (MAP) is higher when EGR is added to the intake air than with no EGR. To determine system integrity, MAP data are collected at an operating condition at which EGR is provided at both the normal EGR setting and with the EGR valve closed. If MAP at the two settings is the same, or nearly so, a fault in the EGR system is indicated. Simultaneously, MAF data are collected and analyzed for the same purpose, as EGR displaced air in the intake manifold and reduces air induction, i.e., a lower MAF reading. During the period that the EGR valve is turned off to perform the diagnostic, engine emissions are temporarily impacted. Although the routine contributes only a modest increase in emissions, this can present a challenge when attempting to meet very low emission targets.

In response to a desire to have an EGR monitor which doesn't impact emissions, a non-intrusive monitor was developed and is disclosed in U.S. Pat. No. 6,850,834 B1, which is commonly assigned and incorporated herein in its entirely. In some non-intrusive monitors, engine sensor data, such as MAP and mass air flow (MAF) are collected at normally calibrated operating conditions, i.e., no interference in the normal operating conditions is imposed to facilitate the EGR OBD routine. The data are classified into ranges and cast in equations describing expected behavior. That is, as described above, EGR is known to impact MAP in a manner which can be modeled or estimated. A linear relationship between MAP and MAF with no EGR can be determined. Data collected at which EGR is being used is expected to deviate from the relationship with no EGR. If, however, data collected with EGR lies on the no EGR line, then a fault in the EGR system is determined.

The statement that MAF is substantially linearly related to MAP at a given engine speed and EGR rate ignores the effect that carbon canister purging and variable valve timing (VVT) have on this relationship. In particular, during purging of the carbon canister air and fuel vapor are supplied to the intake manifold at a location downstream of the MAF sensor. The purge air introduced into the intake manifold affects MAP, but is not measured by the MAF sensor, thereby confounding the effects that EGR has on MAP. At steady state, VVT presents no confounding of the linear MAF and MAP relationship. However, a rapid change in VVT causes a manifold filling delay such that the MAF and MAP do not track each other. An EGR OBD routine can be confounded by the transient caused by rapid VVT adjustments. In typical engine installations, (i.e., not hybrid electric vehicles, non-HEVs) there is sufficient operating time at which canister purge is not occurring so that sampling can take place. Also, in non-HEVs, VVT timing is not employed aggressively, meaning that highly retarded valve timings are not used often and the rate of change in valve timing is typically modest. Thus, the problem of delay was not found to substantially impair the accuracy of the EGR OBD routine in non-HEVs. Because an HEV has the capability of providing less than the full torque to the wheels by being supplemented by the electric motor and providing more than the desired torque with the extra used to generate electricity, more aggressive use of VVT can be accommodated, both in highly retarded timings and rapid rates of change in valve timing. Additionally, in HEVs, the internal combustion engine is operated for periods of time with periods of inactivity in between while the electric motor is providing propulsion. Consequently, the carbon canister is being purged almost all of the time that the engine operates to properly purge the canister. Due to these two factors, it has found that the non-intrusive EGR OBD monitor developed for a non-HEV, when applied to a HEV application, suffers from false detection of EGR system failures, which leads to unnecessary trips to obtain unneeded service and customer dissatisfaction. Thus, a robust EGR OBD monitor for a HEV application is desired.

SUMMARY

To overcome at least one problem, a method for detecting an EGR fault is disclosed which includes: collecting multiple actual MAP values at selected ranges of engine operating conditions, determining multiple inferred MAP values based on MAF and purge valve command, and determining that an EGR fault has occurred when inferred MAP values are substantially equal to actual MAP values at engine operating conditions with a high rate of EGR. In some embodiments, inferred MAP is further based on engine speed. The method may also include: collecting multiple MAF values, collecting multiple purge valve commands, and collecting multiple engine speed values. The multiple MAF values, the multiple purge valve commands, and the multiple engine speed values are collected substantially simultaneous in time with the multiple actual MAP values to provide data pairs between individual actual MAF values and individual inferred MAF values, with each data pair collected at nearly the same time. The multiple inferred MAP values are in a one-to-one correspondence with the actual MAP values. The MAF, engine speed, and purge valve commands on which the inferred MAP is based are collected substantially simultaneous in time with the actual MAP to which the inferred MAP is compared.

The selected ranges of engine operating conditions include: a first range in which the commanded EGR is a high EGR rate and volumetric efficiency is in a medium range, a second range in which the commanded EGR is a low EGR rate and volumetric efficiency is in a low range, and a third range in which the commanded EGR is a low EGR rate and volumetric efficiency is in a high range. In some embodiments, low EGR rate is substantially no EGR.

The purge valve command is used in determining inferred MAP to compensate for flow into an engine intake from a carbon canister to which the purge valve is coupled. In some embodiments, a diagnostic routine is performed on the carbon canister system coupled to an intake of the engine. If a fault is indicated in the carbon canister system, no EGR fault is communicated to the electronic controller. In the event that a fault in the EGR system is detected while there is no such fault in the carbon canister system, then the EGR fault is communicated to the electronic controller. In some embodiments, the engine is provided with a variable valve timing device and data collection in first, second, and third ranges is further based on the variable valve timing device being at a stable setting for a predetermined period.

In some embodiments, data collection of data from which inferred MAP is determined and actual MAP are delayed until key-on cold-start procedures are completed.

In hybrid electric vehicle embodiments, the engine may be operated intermittently, in which case the collection of actual MAP and inferred MAP data is further delayed for a predetermined period of time after the engine is restarted.

If an EGR fault is determined, the EGR fault is communicated to a memory location in an electronic controller in the engine.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
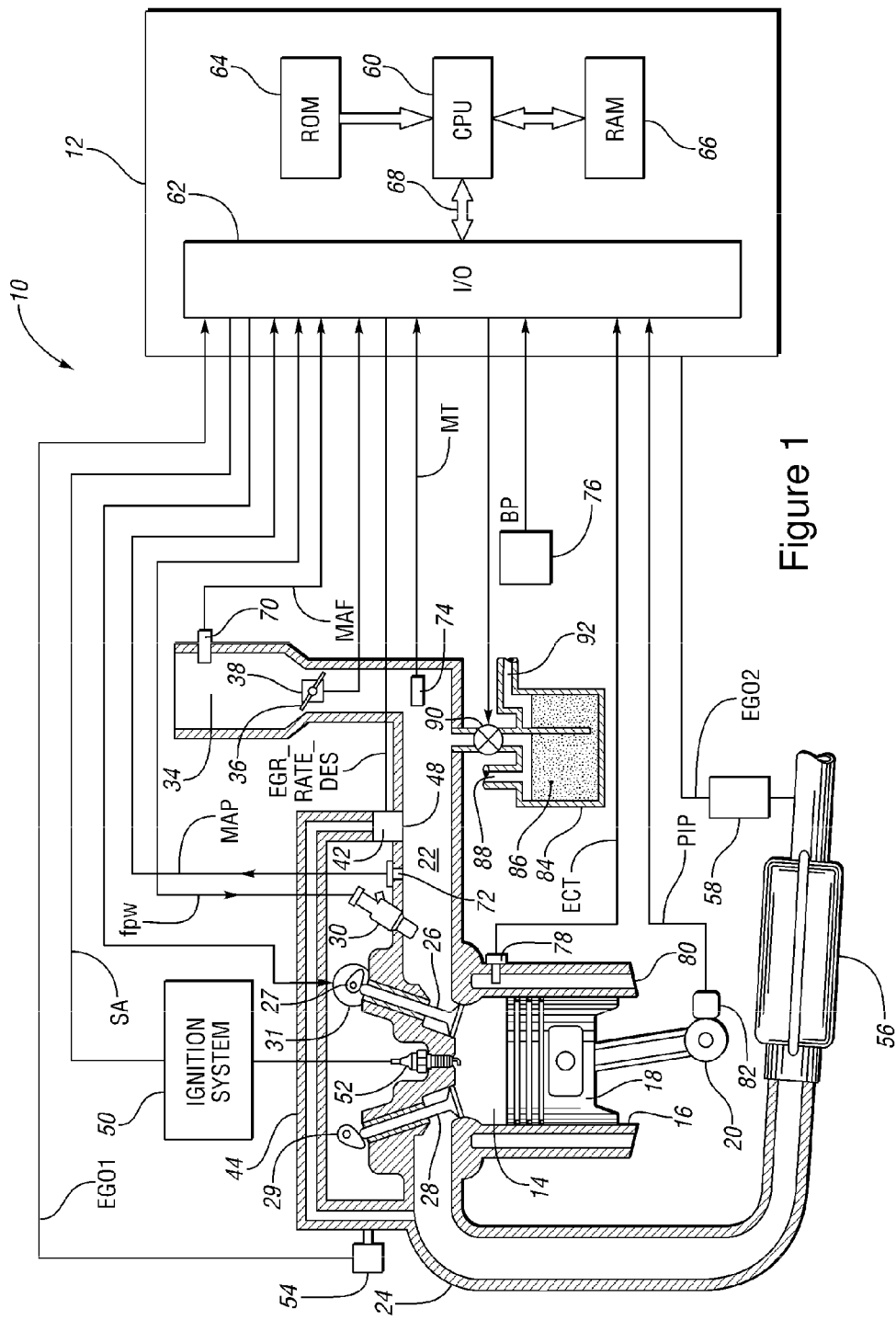
FIG. 1 is a schematic representation of a single cylinder of an internal combustion engine.

Referring to FIG. 1, an internal combustion engine 10 is shown having a plurality of cylinders, one cylinder of which is shown in FIG. 1, controlled by electronic engine controller 12. Engine 10 includes combustion chamber 14 and cylinder walls 16 with piston 18 positioned therein and connected to crankshaft 20. Combustion chamber 14 is shown communicating with intake manifold 22 and exhaust manifold 24 via respective intake valve 26 and exhaust valve 28. A cam 29, which is part of a camshaft, not shown, actuates exhaust valve 28 when the tip of cam 29 presses down on exhaust valve 28. Similarly, cam 27 actuates intake valve 26. The timing of intake valve 26 can be varied by variable valve timing (VVT) device 31 under control of the electronic engine controller 12. A conventional variable cam timing device is shown in FIG. 1. However, any suitable device to adjust valve timing can be used, one example being an electromechanically-actuated system in which the valve events are fully variable.

Intake manifold 22 is also shown having fuel injector 30 coupled thereto for delivering liquid fuel in proportion to the pulse width of signal FPW from controller 12. Both fuel quantity, controlled by signal FPW and injection timing are adjustable. Fuel is delivered to fuel injector 30 by a conventional fuel system (not shown) including a fuel tank, fuel pump, and fuel rail. Alternatively, the engine may be configured such that the fuel is injected directly into the cylinder of the engine, which is known to those skilled in the art as a direct-injection engine. Intake manifold 22 is shown communicating with throttle body 34 via throttle plate 36. Throttle position sensor 38 measures position of throttle plate 36.

Exhaust manifold 24 is shown coupled to EGR valve 42 via an exhaust gas recirculation tube 44. EGR valve 42 is also coupled to intake manifold 22 via inlet 48 to the intake manifold 22. The flow through EGR valve 42 to intake manifold 22 is controlled by a control signal determined by an EGR_RATE_DES signal and provided by controller 12.

Ignition system 50 provides ignition spark to combustion chamber 14 via spark plug 52 in response to controller 12. Two-state exhaust gas oxygen sensor 54 is shown coupled to exhaust manifold 24 upstream of catalytic converter 56.

Two-state exhaust gas oxygen sensor 58 is shown coupled to exhaust manifold 24 downstream of catalytic converter 56. Sensors 54 and 58 provide signals EGO1 and EGO2, respectively, to controller 12 which may convert these signal into two-state signals, one state indicating exhaust gases are rich of a reference air/fuel ratio and the other state indicating exhaust gases are lean of the reference air/fuel ratio.

Controller 12 is shown in FIG. 1 as a conventional microcomputer including: microprocessor unit 60, input/output ports 62, read-only memory 64, here a semiconductor chip, random access memory 66, and a conventional data bus 68. Controller 12 is shown receiving various signals from sensors coupled to engine 10, in addition to those signals previously discussed, including: a mass air flow (MAF) from mass flow sensor 70 coupled to intake manifold 22 before throttle 34; a measurement of manifold absolute pressure (MAP) from pressure sensor 72; an intake manifold temperature (MT) signal from temperature sensor 74; an engine coolant temperature (ECT) from temperature sensor 78 coupled to cooling sleeve 80; and a profile ignition pickup (PIP) signal from Hall effect sensor 82 coupled to crankshaft 20 and used as an engine speed signal producing a predetermined number of equally spaced pulses every revolution of the crankshaft. Also included is a barometer 76 for measuring barometric pressure, BP.

A carbon canister 84 is coupled to the intake 22 via a purge valve 90. Fuel vapors, which are displaced from the fuel tank during filling (not shown), enter carbon canister 84 through inlet 88. The fuel is absorbed onto carbon pellets 86 in carbon canister 84 and air is released to the atmosphere through opening 92. When engine 10 is operating, valve 90 can be opened. Vacuum in intake 22 draws atmospheric air through carbon canister 84 through opening 92. The atmospheric air strips the fuel vapors from carbon pellets 86 into intake 22 and into combustion chamber 14 to be combusted. In such a manner, carbon canister 84 is purged so that carbon pellets 86 can absorb fuel vapor when air laden with fuel vapors are introduced into carbon canister 84 during a refueling event. In one embodiment, purge valve 90 is a solenoid valve, which can be commanded to assume a position in between fully open and fully closed by providing a pulse width modulated signal. Based on the command to valve 90, and a pressure difference between intake 22 and atmospheric pressure (BP), an amount of air inducted into engine 10 through carbon canister 84 can be estimated.

Figure 2:
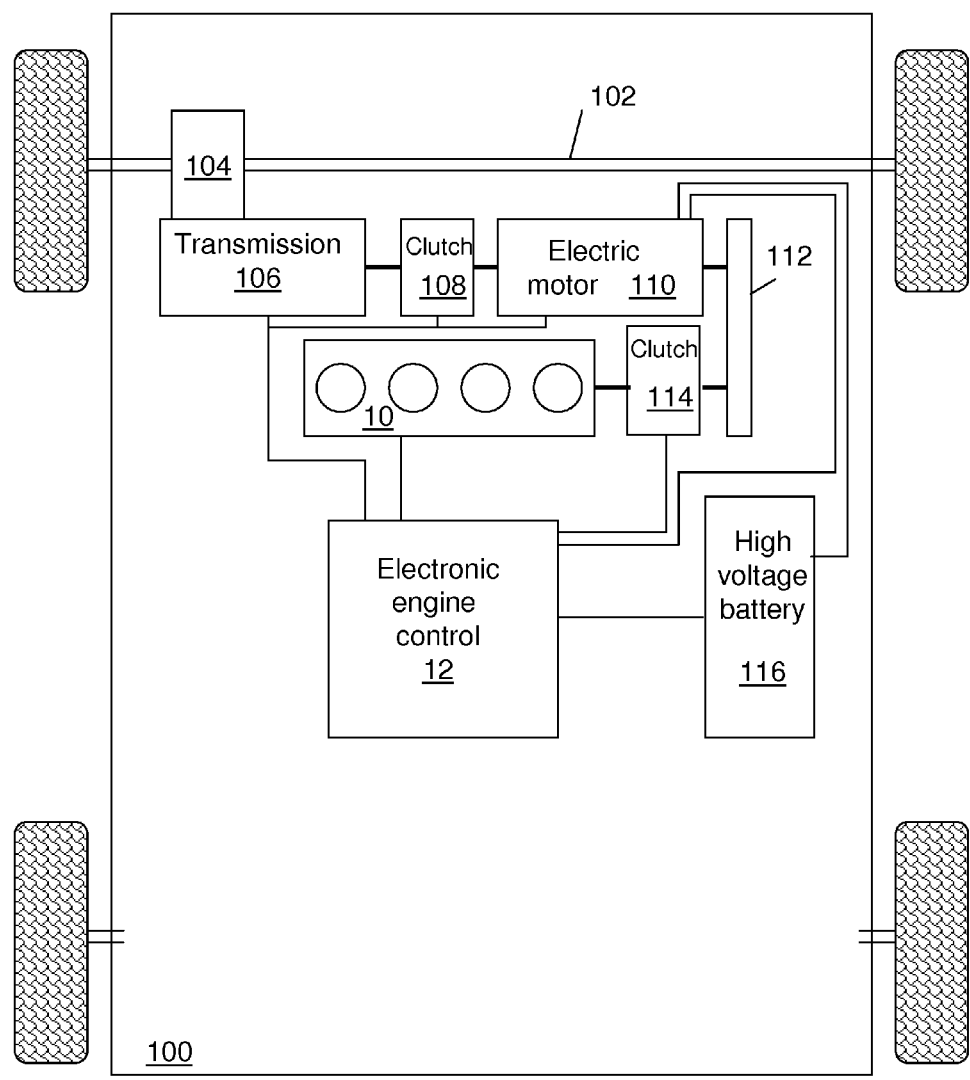
FIG. 2 is a schematic representation of a HEV including both an electric motor and internal combustion engine for propulsion.

Engine 10 may be part of an integrated motor assist HEV 100 as shown schematically in FIG. 2. Front wheels are coupled to a front axle 102. A differential and final drive gear set 104 are coupled to front axle 102. The vehicle powertrain system is coupled to differential 104 through a transmission 106. Transmission 106 is coupled to an electric motor 110 via a clutch 108. Electric motor 110 is coupled to engine 10 via a clutch 114. Electric motor 110, in the arrangement shown in FIG. 2, can be called an integrated starter generator (ISG) because it can be used to spin up engine 10 for starting purposes. It is likely that not all of the powertrain components can be coupled end to end within the width of HEV 100. In the embodiment shown in FIG. 2, a chain drive 112 is provided between engine 10 and electric motor 110 such that engine 10 rotates along a first axis and electric motor 110 and transmission 106 rotate along a second axis substantially parallel to the first axis. The configuration in FIG. 2 illustrates simply one HEV configuration. There are many alternatives for configuring HEV which do not depart from the scope of the present disclosure. HEV 100 shows an arrangement in which internal combustion engine 10 is coupled to the front wheels. In another embodiment, engine 10 is coupled to the rear axle. Electric motor 110 can operate as a motor providing torque to the associated axle or as generator absorbing torque from the associated axle, i.e., providing a braking force on wheels associated with the axle. Electric motor 110 is coupled to high voltage battery 116, which acts as a source and sink for electrical energy. Engine control unit 12 is shown coupled to engine 10, transmission 106, electrical motor 110, clutch 114, and high voltage battery 116. The integrated motor assist HEV is presented as one possible type of HEV and not intended to be limiting. Another example HEV configuration is described in commonly assigned U.S. Pat. No. 7,275,518, which is incorporated herein by reference in its entirety.

Referring again to FIG. 1, MAF sensor 70 is disposed upstream of inlet 48 to intake manifold 22 and MAP sensor 72 is disposed downstream of inlet 48. MAF sensor 70 measures only fresh air supplied to engine 10, i.e., does not measure EGR flow. However, a signal from MAP sensor 72 (MAP_act) is affected by EGR. An inferred MAP, MAP_inf, can be computed based on the signal from MAF sensor 70, a PIP signal indicating engine rpm, and engine displacement (known). The difference between MAP_inf and MAP_act can be used to determine whether the EGR system is working properly. In an alternative embodiment, MAP_inf and MAP_act can be used to estimate EGR_act. By comparing EGR_act with EGR_des, where EGR_des is computed based on commands to the EGR valve, EGR system integrity can be evaluated. However, as discussed above, other factors also affect the MAP_inf and MAP_act difference. Referring to FIG. 1, when valve 90 is commanded to open to facilitate purge of carbon canister 84, MAP_act increases, but MAP_inf is largely unaffected. Also, rapid changes in valve timing causes a momentary difference between MAP_act and MAP_inf which also confounds the data. In FIG. 1, a VVT device 31 is shown associated with intake cam 27, but not one associated with exhaust cam 29. But, all combinations (intake only, exhaust only, intake and exhaust, and none) are within the scope of the present invention.

To obtain a sufficiently accurate assessment of EGR integrity, multiple measurements of MAP and MAF are taken. Because engine operating conditions are constantly changing, data from three ranges are collected to diagnose the EGR system, including: a first range in which the commanded EGR is in a high EGR range and volumetric efficiency is in a medium range, a second range in which the commanded EGR is in a low EGR range and volumetric efficiency is in a low range, and a third range in which the commanded EGR is in a low range and the volumetric efficiency is in a high range. Volumetric efficiency, vol_eff, is substantially: vol_eff=2*MAF/(N*Vd), where N is engine rpm and Vd is engine displacement. The factor of two accounts for the fact that there is an intake stroke every other engine revolution in a 4-stroke engine.

Figure 3:
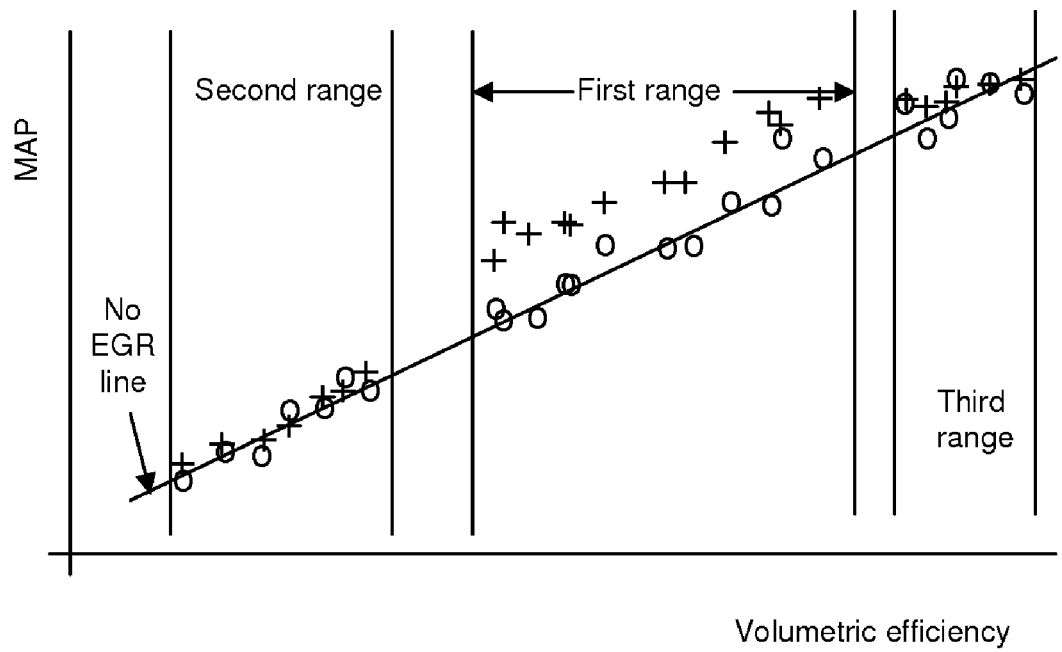
FIG. 3 is graph of MAP as a function of volumetric efficiency with three data collection ranges.

Conditions falling in the first range are ones in which a significant amount of EGR is used. Conditions falling in the second range typically have low amounts of EGR, if any, because such conditions have relatively high levels of exhaust gas remaining in the cylinder and addition of more, due to EGR, negatively affects combustion stability. Conditions falling in the third range typically have low amounts of EGR due to the manifold pressure being high at such conditions. Thus, there is limited vacuum to draw EGR through the EGR system into the intake. In FIG. 3, a plot of MAP as a function of volumetric efficiency is shown for three ranges. The three ranges are shown not overlapping, but such example is not intended to limit the present disclosure. The solid line shows the linear relationship of MAP to volumetric efficiency. Recall that MAP has a nearly linear relationship with MAF at a particular engine rpm. As vol_eff is related to MAF divided by engine rpm, the data collected at a range of engine rpm can be plotted on a single graph. The points indicated by a plus sign in the graph are actual MAP values at a range of conditions. The data in the second and third ranges roughly lie on the line and define the linear relationship. In the first range, however, due to significant EGR being added to the intake air, the actual MAP exceeds the solid line of what would be expected for MAP when no EGR is added. The circles are the inferred MAP, which is determined based on MAF. Because MAF is measured prior to EGR affecting a reading, MAP_inf lies approximately on the solid line. There is a one-to-one correspondence between MAP_inf and MAP_act, i.e., at each sample a MAP_act is measured and a MAP_inf is computed. There are no data shown at volumetric efficiencies falling in between the ranges because according to one embodiment of the disclosure, data are collected only when the operating condition falls into one of the three ranges. The engine is not prevented from operating at other conditions; it is simply that data outside of the three ranges are excluded from consideration in the diagnostic routine.

In a HEV application, there is insufficient engine running time to collect enough data, if data are excluded based on the carbon canister purge occurring. If so, few data points would be collected and the EGR diagnosis would not be accomplished frequently enough. Alternatively, the data are not excluded based on carbon canister purging or valve timing, in which case, the EGR OBD identifies false positives due to the confounding of the results by canister purge. To overcome, MAP_inf is computed as a function of purge valve duty cycle, as well as MAF and engine rpm, N.

Figure 4:
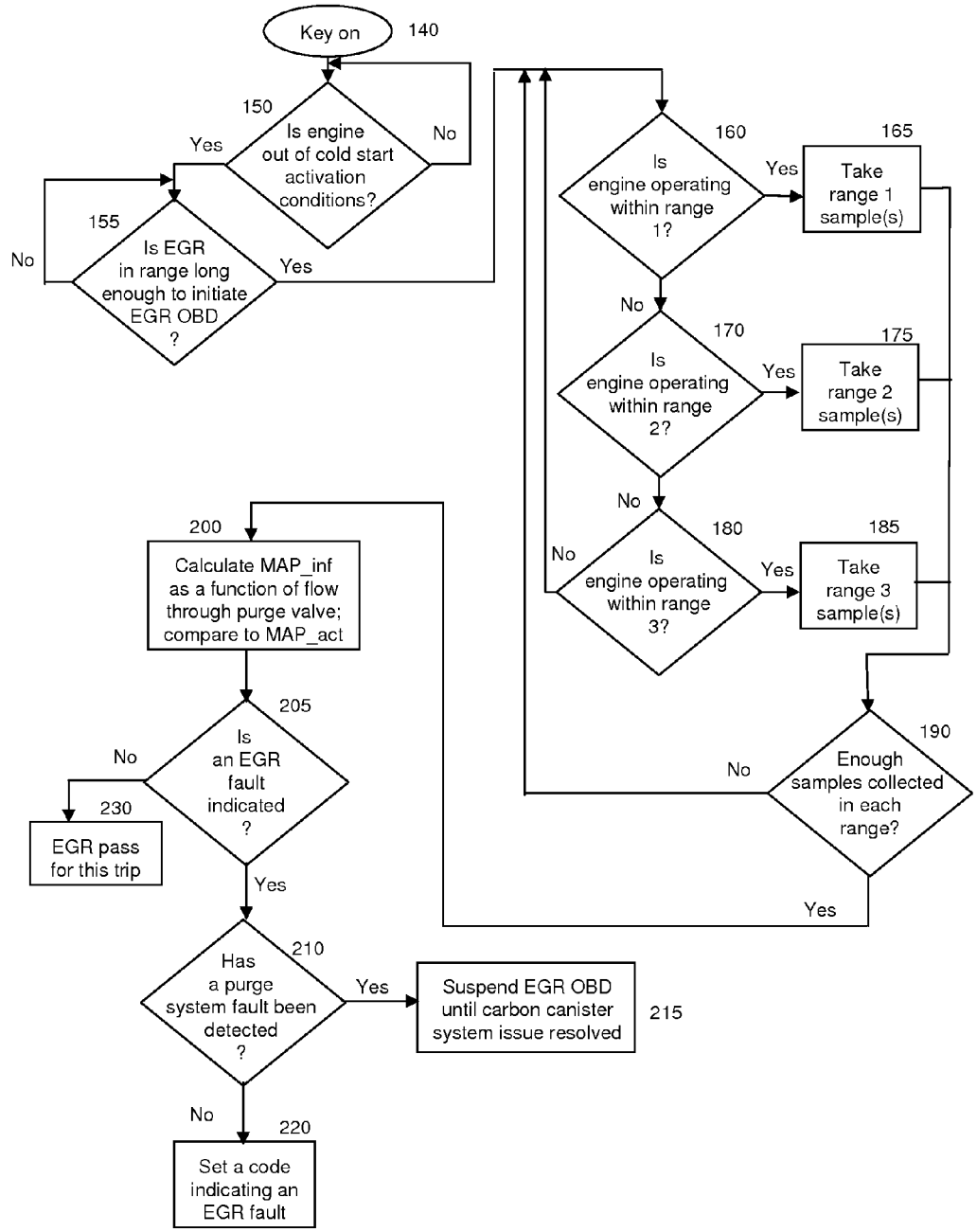
FIG. 4 is a flowchart illustrating one embodiment of the disclosure.

A flowchart in FIG. 4 starts at key on in 140. In block 150, it is determined whether the engine is out of the cold start activation conditions. These may include ensuring that a period in which cold-start spark retard is employed has been completed. A positive result passes control to block 155 to determine whether EGR has been in range long enough to initiate the EGR OBD routine. Essentially, before proceeding, it is ensured that temperatures are such that EGR is being commanded within normal ranges, not at cold-start levels at which EGR levels may be reduced to ensure good combustion stability. Once HEV has achieved a positive result in 155, control does not return to 150 and 155, even though the engine turns on and off frequently, although not key off. A positive result in 155 passes control to block 160, in which it is determined whether the engine is operating within range 1. Primarily, it is determined whether a higher rate of EGR is commanded and whether the volumetric efficiency is in a medium range. One additional factor employed, in some embodiments, is that VVT is within a particular range, e.g., less than 15 degrees of advance. In other embodiments, VVT must be in a stable range, meaning that it has not undergone a recent, rapid change in timing to ensure sufficient time has elapsed for manifold filling to stabilize. Another factor, in some embodiments, is that the internal combustion engine has been operated for a short duration, e.g., 3-5 seconds, since the last shutdown to allow time for stabilization. If all the conditions for taking a sample in range 1 are met, control passes to 165 in which one or more samples are collected. Although not shown explicitly in FIG. 4, there is a feedback between blocks 160 and 165 where the engine operating condition continues to be qualified in block 160 and samples taken in 165, until the engine falls out of range 1. In some situations, all the required samples to provide sufficient accuracy in a particular range can be collected within a short window of time when the engine remains in that particular range for a sufficient duration. In other situations, block 160 is accessed many times via other blocks 180 or 190 to obtain a sufficient number of samples. If a negative result in 160, control passes to 170 in which it is determined whether the engine is operating within range 2, low EGR rate and low volumetric efficiency. As in block 160, a positive result from 170 may also be predicated on VVT being in a predefined range, just prior VVT adjustments being not too rapid, and the engine having stabilized for a short period since it was restarted. If a positive result in 170, control passes to 175 to take at least one range 2 sample. Depending on how long the engine remains in range 2, possibly all samples are collected. If a negative result in 170, control passes to 180 to determine whether the engine is in range 3, low EGR rate and high volumetric efficiency. As with block 160 and 170, additional criteria can be applied beyond EGR and volumetric efficiency being in a particular range. If a negative result in block 175, control passes to 160 to determine whether the engine is now in operating range 1. If a positive result in 180, control passes to 185 to take one or more range 3 samples. Control then passes to 190 to determine whether enough samples have been collected in each of the 3 ranges. If a negative result, control passes back to 160. If enough samples have been collected, i.e., a positive result in block 190, control passes to block 200 in which MAP_inf is calculated for each sample point. Compensation for purge air inducted through the carbon canister into the engine intake is included in the computation of MAP_inf. In block 210, it is determined whether the data indicate an EGR fault. If a positive result in block 205, control passes to block 210 to determine whether a purge system fault has been detected. If the purge system is not operating properly, the EGR OBD routine does not provide a reliable result; thus, if a positive result in 210, EGR OBD is suspended in block 215. If a negative result in block 210, control passes to block 220 to set a code in the controller. In one embodiment, a dashboard light is illuminated to alert the operator to obtain service. If a negative result in block 205, control passes to block 230 and the EGR OBD was successfully completed for this trip.

In an alternative embodiment, in the event of a negative result in block 205, control passes back to block 160 to initiate another EGR OBD check. In yet another alternative, a delay is inserted between block 205 and 160 so that the EGR OBD is conducted at appropriate intervals.

In an alternate embodiment, the test performed in 160 contains two tests: whether the engine is operating within range 1 and whether an insufficient number of range 1 samples have been collected. If both of these tests return a true result (Boolean and), control passes to 165. If either of these tests provides a false result, control passes to 170. Blocks 170 and 180 can also include multiple tests such as is described in regard to block 160.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. A suitable compromise, depending on the application, may be selected. The embodiments described as being less desirable relative to other embodiments with respect to one or more characteristics are not outside the scope of the disclosure as claimed.

What is claimed:

1. A method for detecting an EGR fault in an engine, comprising:
    collecting multiple actual MAP values at selected ranges of engine operating conditions;
    determining multiple inferred MAP values based on a MAF and a purge valve command associated with purge airflow from a coupled carbon canister; and
    determining that an EGR fault has occurred when inferred MAP values are substantially equal to actual MAP values at engine operating conditions with a high rate of EGR.

2. The method of claim 1 wherein the inferred MAP is further based on engine speed.

3. The method of claim 2, further comprising:
    collecting multiple MAF values having associated purge valve commands; and
    collecting multiple engine speed values, wherein the multiple MAF values, the associated purge valve commands, and the multiple engine speed values are collected substantially simultaneously in time with the multiple actual MAP values to provide data pairs between individual actual MAF values and individual inferred MAF values, with each data pair collected at nearly the same time.

4. The method of claim 2 wherein the multiple inferred MAP values are in a one-to-one correspondence with the actual MAP values; and the MAF, engine speed, and purge valve commands on which the inferred MAP is based are collected substantially simultaneous in time with the actual MAP to which the inferred MAP is compared.

5. The method of claim 1 wherein the selected ranges of engine operating conditions comprise:
    a first range in which the commanded EGR is a high EGR rate and volumetric efficiency is in a medium range;
    a second range in which the commanded EGR is a low EGR rate and volumetric efficiency is in a low range; and
    a third range in which the commanded EGR is a low EGR rate and volumetric efficiency is in a high range.

6. The method of claim 5 wherein low EGR rate is substantially no EGR.

7. The method of claim 5 wherein the engine is provided with a variable valve timing device and data collection in first, second, and third ranges is further based on the variable valve timing device being at a stable setting for a predetermined period.

8. The method of claim 1, further comprising:
delaying the collecting of actual MAP and data to determine inferred MAP until key-on cold-start procedures are completed.

9. The method of claim 8 wherein the engine is disposed in a hybrid electric vehicle and the engine is operated intermittently, the method further comprising:
delaying the collecting of actual MAP and data upon which inferred MAP is based for a predetermined period of time after the engine is restarted.

10. The method of claim 1, further comprising:
communicating the EGR fault to a memory location in an electronic controller coupled to the engine.

11. The method of claim 1 wherein the purge valve command is used in determining inferred MAP to compensate for flow into an engine intake from a carbon canister to which the purge valve is coupled.

12. The method of claim 1, further comprising:
performing a diagnostic routine on a carbon canister system coupled to an intake of the engine;
storing such EGR fault, if any, to a memory location in an electronic controller coupled to the engine when the diagnostic on the carbon canister system indicates no faults; and
preventing storing such EGR fault, if any, to the memory location when the diagnostic on the carbon canister system indicates a fault.

13. An EGR monitor for an engine, comprising:
a MAP sensor coupled to an engine intake;
a MAF sensor coupled to the engine intake;
an engine speed sensor coupled to the engine;
a carbon canister system coupled to the engine intake via a purge valve;
an EGR valve in an EGR duct coupling the engine intake and an engine exhaust;
an electronic control unit electronically coupled to the engine, the MAP sensor, the MAF sensor, the engine speed sensor, the carbon canister valve, and the EGR valve, the electronic control unit collecting multiple values of actual MAP, MAF, and engine speed; determining a linear relationship between actual MAP and volumetric efficiency for a first portion of the multiple values in which EGR rate is in a low range; and determining that an EGR fault has occurred when actual MAP and volumetric efficiency data pairs for a second portion of the multiples values in which EGR rate is in a high range deviate from the linear relationship determined for the first portion of the multiple values.

14. The monitor of claim 13 wherein the engine is disposed in a hybrid electric vehicle and the multiple values of actual MAP and volumetric efficiency are collected after the engine is operating in a stable fashion following an engine start, with a stable fashion comprising: intake valve timing in a normal range for a present operating condition and EGR rate in a normal range for the present operating range.

15. The monitor of claim 13 wherein the volumetric efficiency is computed based on MAF, engine speed, a command to the purge valve and a pressure difference across the purge valve, with the purge valve command and the pressure difference across the purge valve used to compensate the computed volumetric efficiency for air entering the engine intake through the carbon canister.

16. A method for detecting an EGR fault in an engine, comprising:
measuring an actual MAP;
determining an inferred MAP based on a MAF and a flow from a carbon canister system coupled to the engine; and
basing an EGR fault on the inferred MAP being substantially equal to the actual MAP at an engine operating condition with a high rate of EGR.

17. The method of claim 16 wherein the EGR fault is further based on multiple comparisons of inferred MAP and actual MAP.

18. The method of claim 17 wherein the multiple comparisons of inferred MAP and actual MAP are determined in three engine operating ranges to determine EGR fault, the three ranges comprising:
a first range in which the commanded EGR is a high EGR rate and volumetric efficiency is in a medium range;
a second range in which the commanded EGR is a low EGR rate and volumetric efficiency is in a low range; and
a third range in which the commanded EGR is a low EGR rate and volumetric efficiency is in a high range.

19. The method of claim 18 wherein the carbon canister is coupled to the engine intake via a solenoid valve and flow from the carbon canister into the engine intake is determined based on pressure in the intake system, barometric pressure, and a pulse width commanded to the solenoid valve.

20. The method of claim 18 wherein the engine has a variable valve timing device coupled to adjust intake valve timing and data collected in the three ranges are further limited such that intake valve timing is stable, without abrupt change in intake valve timing just prior to data collection.

* * * * *